(12) United States Patent
Kim et al.

(10) Patent No.: US 10,374,206 B2
(45) Date of Patent: Aug. 6, 2019

(54) LITHIUM BATTERY ELECTRODE AND METHOD OF MANUFACTURING THE SAME

(71) Applicant: Electronics and Telecommunications Research Institute, Daejeon (KR)

(72) Inventors: Ju Young Kim, Daejeon (KR); Kwang Man Kim, Daejeon (KR); Dong Ok Shin, Daejeon (KR); Young-Gi Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 231 days.

(21) Appl. No.: 15/617,733

(22) Filed: Jun. 8, 2017

(65) Prior Publication Data
US 2018/0062143 A1 Mar. 1, 2018

(30) Foreign Application Priority Data

Aug. 29, 2016 (KR) .................. 10-2016-0110279
Nov. 17, 2016 (KR) .................. 10-2016-0153569

(51) Int. Cl.
*H01M 2/14* (2006.01)
*H01M 2/18* (2006.01)
(Continued)

(52) U.S. Cl.
CPC ............. *H01M 2/18* (2013.01); *H01M 2/145* (2013.01); *H01M 2/1653* (2013.01);
(Continued)

(58) Field of Classification Search
CPC .. H01M 2/18; H01M 10/4235; H01M 10/052; H01M 2/1653; H01M 2/145; H01M 2/1686
See application file for complete search history.

(56) References Cited

U.S. PATENT DOCUMENTS 9,123,970 B2    9/2015 Lee et al.
9,196,884 B2   11/2015 Hong et al.
(Continued)

FOREIGN PATENT DOCUMENTS

KR          10-1105876 B1    1/2012
KR     10-2015-0084637 A     7/2015
(Continued)

OTHER PUBLICATIONS

Myung-Hyun Ryou et al., "Mechanical Surface Modification of Lithium Metal: Towards Improved Li Metal Anode Performance by Directed Li Plating", Advanced Functional Matters, vol. 25, pp. 834-841, 2015.
(Continued)

*Primary Examiner* — Stewart A Fraser
(74) *Attorney, Agent, or Firm* — Rabin & Berdo, P.C.

(57) ABSTRACT

A lithium battery according to the inventive concept may comprise a cathode, an anode separated from the cathode, a first separator disposed between the cathode and the anode, the first separator having first pores, a second separator disposed on the first separator, the second separator having second pores, and an electrolyte filling a gap between the cathode and the anode. Diameters of the second pores may be smaller than those of the first pores. A standard deviation of the diameters of the second pores is smaller than that of the first pores.

18 Claims, 17 Drawing Sheets

(51) Int. Cl.
  *H01M 10/052* (2010.01)
  *H01M 2/16* (2006.01)
  *H01M 10/42* (2006.01)

(52) U.S. Cl.
  CPC ....... *H01M 2/1686* (2013.01); *H01M 10/052* (2013.01); *H01M 10/4235* (2013.01); *Y02T 10/7011* (2013.01)

(56) References Cited

U.S. PATENT DOCUMENTS

2013/0157106 A1    6/2013   Lee et al.
2014/0170465 A1    6/2014   Visco et al.
2015/0140398 A1*   5/2015   Yamazaki ........... H01M 2/1686
                                                      429/127
2016/0276643 A1*   9/2016   Iwase ................. H01M 2/1686

FOREIGN PATENT DOCUMENTS

KR     10-1536560 B1      7/2015
KR     10-2016-0088973 A  7/2016

OTHER PUBLICATIONS

Zheng Liang et al., "Polymer Nanofiber-Guided Uniform Lithium Deposition for Battery Electrodes", Nano Letters, vol. 15, pp. 2910-2916, Mar. 30, 2015.

Xin-Bing Cheng et al., "Dendrite-Free Lithium Deposition Induced by Uniformly Distributed Lithium Ions for Efficient Lithium Metal Batteries", Advanced Matters, vol. 28, pp. 2888-2895, 2016.

* cited by examiner

LITHIUM BATTERY ELECTRODE AND METHOD OF MANUFACTURING THE SAME

CROSS-REFERENCE TO RELATED APPLICATIONS

This U.S. non-provisional patent application claims priority under 35 U.S.C. § 119 to Korean Patent Application Nos. 10-2016-0110279 and 10-2016-0153569, filed on Aug. 29, 2016 and Nov. 17, 2016, the disclosures of which are incorporated herein in their entirety by reference.

BACKGROUND

The inventive concept relates to a lithium battery and, more particularly, to a separator of a lithium battery and a method of manufacturing the same.

Lithium battery is widely used in power sources for portable electronic devices such as mobile phones and notebooks. The lithium battery has high storage capacity, good charging/discharging characteristics, and high processibility, compared with other energy storage devices. Accordingly, the technical field to which the lithium battery is applicable is becoming increasingly widespread (e.g., to wearable devices, electric vehicles, and energy storage systems (ESS)).

The lithium battery may include a cathode, a separator, an anode, and an electrolyte. The electrolyte may include a lithium salt and a solvent in which the lithium salt is dissolved. The electrolyte may serve as a medium, allowing ions to move between the anode and the cathode. There is an increasing demand for a lithium battery with high stability and efficiency.

SUMMARY

Embodiments of the inventive concept may provide methods of manufacturing a lithium battery with excellent electric characteristics and high-capacity.

Embodiments of the inventive concept may provide methods of manufacturing a lithium battery with improved durability.

In one aspect, a lithium battery may include: a cathode, an anode separated from the cathode, a first separator disposed between the cathode and the anode, the first separator having first pores, a second separator disposed on the first separator, the second separator having second pores, and an electrolyte filling a gap between the cathode and the anode. Diameters of the second pores may be smaller than those of the first pores. A standard deviation of the diameters of the second pores may be smaller than that of the first pores.

In some embodiments, a distance between the second pores may be smaller than a distance between the first pores.

In some embodiments, at least some of the second pores may be connected to the first pores. The second separator may be in direct physical contact with the first separator.

In some embodiments, the second separator may face the anode.

In some embodiments, the lithium battery may further include a third separator that is disposed on the second separator and has third pores. The diameters of the third pores may be smaller than those of the first pores. A standard deviation of the diameters of the third pores may be smaller than that of the first pores.

In some embodiments, the second separator may include a plurality of second separators, and the plurality of second separators may be disposed on the first separator.

In another aspect, a method of manufacturing a lithium battery may include: preparing a first separator having first pores, forming a second separator having second pores, on a temporary substrate, and transferring the second separator onto the first separator. Diameters of the second pores may be smaller than those of the first pores. A standard deviation of the diameters of the second pores may be smaller than that of the first pores.

In some embodiments, a distance between the second pores may be smaller than a distance between the first pores.

In some embodiments, wherein at least some of the second pores may be connected to the first pores.

In some embodiments, the method further may include preparing an anode, preparing a cathode, placing the first and second separators between the anode and the cathode, and forming an electrolyte to fill a gap between the anode and the cathode.

In some embodiments, the second separator may face the anode.

In some embodiments, the method further may include forming a third separator that is disposed on the second separator and has third pores.

In some embodiments, diameters of the third pores may be smaller than those of the first pores, and a standard deviation of the diameters of the third pores may be smaller than that of the first pores.

In some embodiments, diameters of the third pores may be smaller than those of the second pores, and a standard deviation of the diameters of the third pores may be smaller than that of the second pores.

In some embodiments, the second separator may include a plurality of second separators, each of which is independently transferred onto the first separator.

In some embodiments, the forming of the second separator may include: coating a block copolymer onto the temporary substrate to form a block copolymer film, applying heat or light to the block copolymer film to form a first block portion and a second block portion, and removing the second block portion to form the second pores exposing the temporary substrate.

In some embodiments, the forming of the second separator may include: forming a carbon structure having oxygen-containing functional groups, thermally treating the carbon structure to form pores, adding the carbon structure into a solvent to form a precursor solution, and coating the temporary substrate with the precursor solution.

In some embodiments, the forming of the second separator may include: preparing a mold having a protruding portion, forming a preliminary separator on the protruding portion of the mold, and transferring the preliminary separator onto the temporary substrate.

BRIEF DESCRIPTION OF THE DRAWINGS

The inventive concept will become more apparent in view of the attached drawings and accompanying detailed description.

FIGS. 5A to 8A are plan views illustrating a method of fabricating a separator structure according to some embodiments of the inventive concepts.

FIGS. 5B to 8B are cross-sectional views taken along the line I'-II' of FIGS. 5A to 8A, respectively.

DETAILED DESCRIPTION OF THE EMBODIMENTS

Figure 1A:
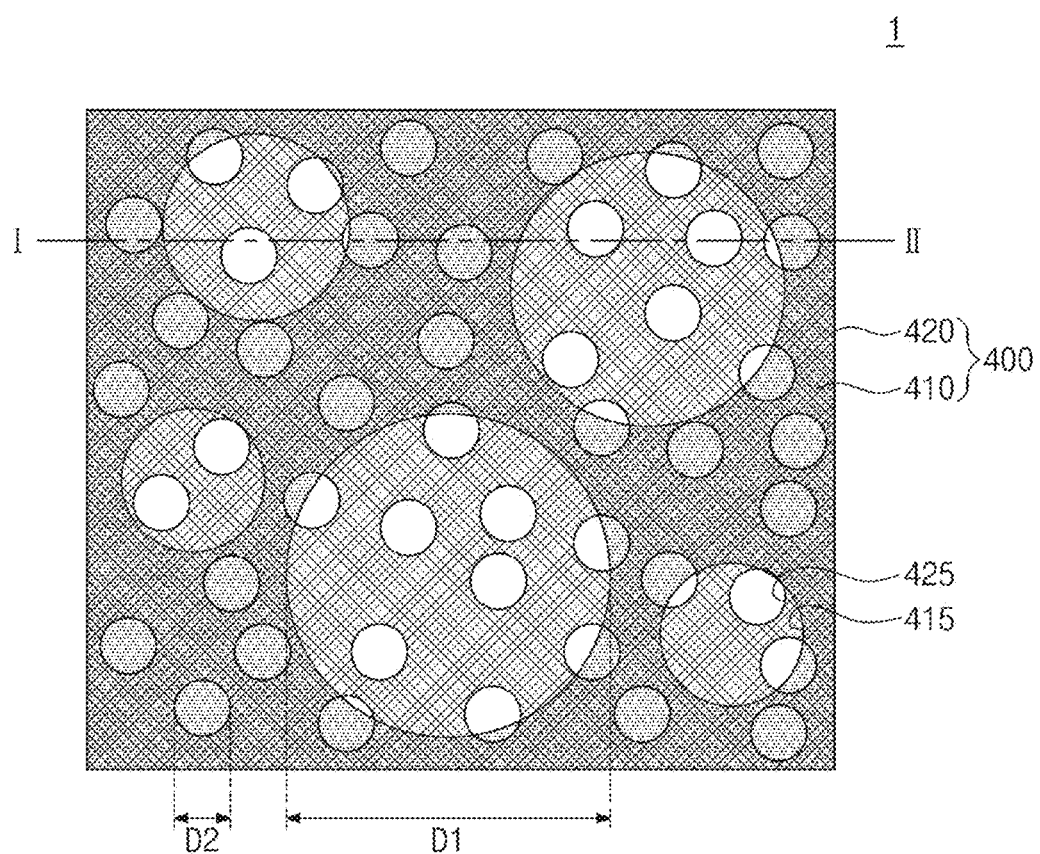
FIG. 1A is a plan view illustrating a lithium battery according to some embodiments of the inventive concepts.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it may be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Hereinafter, a lithium battery according to embodiments of the inventive concept will be described with the reference to the drawings.

Figure 1B:
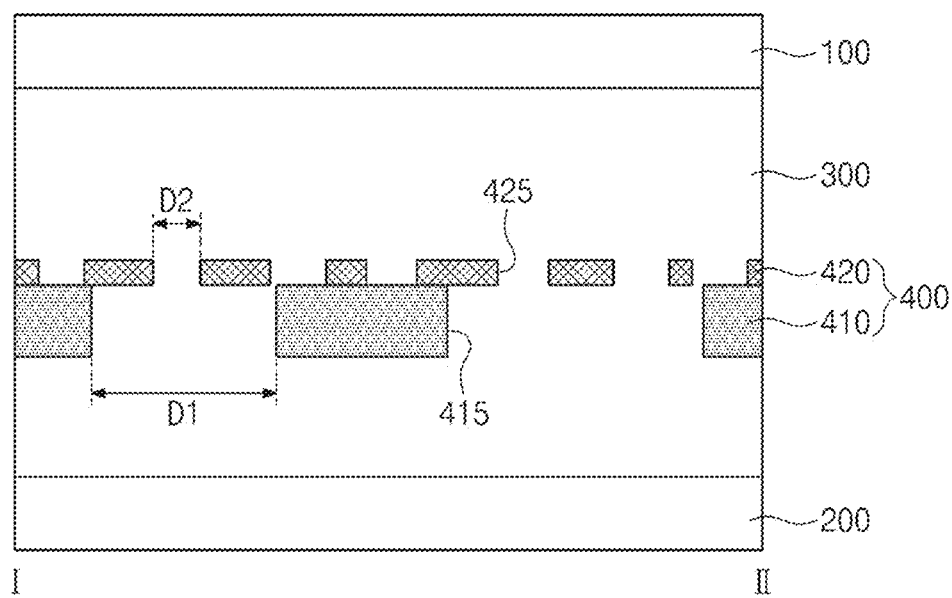
FIG. 1B is a cross-sectional view taken along the line I-II of FIG. 1A.

FIG. 1A is a plan view illustrating a lithium battery according to some embodiments of the inventive concepts. FIG. 1B is a cross-sectional view taken along the line I-II of FIG. 1A.

Referring to FIGS. 1A and 1B, a lithium battery 1 may include an anode 100, a cathode 200, an electrolyte 300, and a separator structure 400. The anode 100 may be separated from the cathode 200. The anode may include a lithium. The electrolyte 300 may fill a gap between the cathode 200 and anode 100. The electrolyte 300 may include lithium ions.

The separator structure 400 may be provided in the electrolyte 300. The separator structure 400 may prevent electrical short between the anode 100 and cathode 200. The separator structure 400 may include a first separator 410 and a second separator 420. The first separator may have first pores 415. The first pores 415 may have first diameters D1. The first diameters D1 of the first pores 415 may be different from each other, as shown in FIG. 1A. In a plan view, the first pores 415 may be spaced apart from each other by a first distance. The first separator 410 may include polymer. For example, the first separator 410 may include polyethylene, polypropylene, and/or cellulose.

A second separator 420 may be provided on the first separator 410. The second separator 420 may be attached onto the first separator 410 and may be in direct physical contact with the first separator 410. The second separator 420 may be provided to face the anode 100. A distance between the anode 100 and the second separator 420 may be smaller than a distance between the anode 100 and the first separator 410. The second separator 420 may have second pores 425. The second pores 425 may have second diameters D2. The second diameters D2 may be smaller than the first diameters D1. For example, an average value of the second diameters D2 may be smaller than an average value of the first diameters D1. The second diameters D2 may range from 0.31 nm to 500 nm. For example, the second diameters D2 may be 0.31 nm to 100 nm. The second pores 425 may be more uniform than the first pores 415 in terms of size, shape, and density. The standard deviation of the second diameters D2 may be smaller than that of the first diameters D1. In a plan view, the second pores 425 may be spaced apart from each other by a second distance. The second distance may be smaller than the first distance. Here, the second distance may mean an average distance between the second pores 425, and the first distance may mean an average distance between the first pores 415. The second pores 425 may be connected to the first pores 415. The second pores 425 may be provided in such a way that at least some of them are overlapped with at least one of the first pores 415 when viewed in a plan view. The lithium ions in the electrolyte 300 may pass through the first pores 415 and the second pores 425. If the second diameters D2 of second pores 425 are smaller than 0.31 nm, it may be difficult for the lithium ions to pass through the second pores 425. A thickness of the second separator 420 may be 1/1000 to 1/20 of a thickness of the first separator 410. If the thickness of the second separator 420 is greater than 1/20 of the thickness of the first separator 410, it may be difficult to reduce a size of the lithium battery 1. In the case where the second separator 420 is further provided on the first separator 410, it may be possible to increase the mechanical strength of the separator structure 400. Thus, it may be possible to prevent or suppress the separator structure 400 from being damaged and thus to improve the stability of the lithium battery 1.

Figure 2:
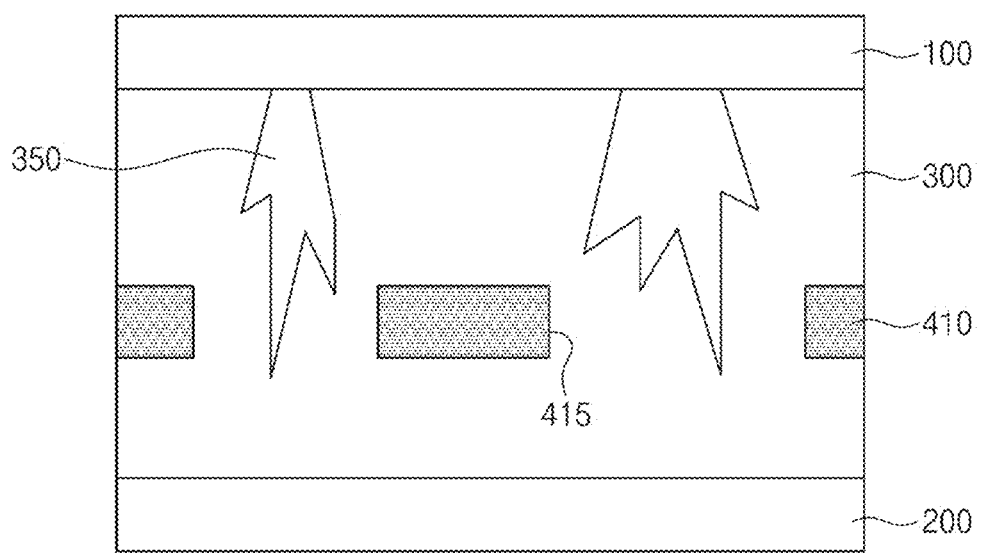
FIG. 2 is a cross-sectional view illustrating a lithium battery according to some embodiments of the inventive concepts.

FIG. 2 is a cross-sectional view illustrating a lithium battery according to some embodiments of the inventive concepts.

Referring to FIG. 2, the lithium battery may include the first separator 410, and may not include the second separator 420. During an operation of the lithium battery, impurities such as a dendrite 350 may be formed on the anode 100. The dendrite 350 may result from crystallization of the lithium ions in the electrolyte 300. The dendrite 350 may be formed at a region where the lithium ions are concentrated. For example, the dendrite 350 may be overlapped with the first pores 415 in plan view. In the case where the dendrite 350 reacts with the electrolyte 300, the lithium battery may suffer from deterioration in performance. If the dendrite 350 is excessively grown to be in contact with the cathode 200, an electrical short may occur between the anode 100 and the cathode 200.

Referring again to FIGS. 1A and 1B, the second pores 425 may be more uniform than the first pores 415 in terms of size, shape, and density. It may be possible to prevent or suppress the lithium ions in the electrolyte 300 from being concentrated in a region of the anode 100. Thus, the formation of impurities such as the dendrite (350 in FIG. 2) may be prevented. In the case where the second separator 420 is provided to face the anode 100, it may be possible to more effectively prevent the formation of dendrite. This may make it possible to improve reliability and stability of the lithium battery 1.

According to some embodiments, the second separator 420 may include least one of graphene and carbon nanotubes. According to other embodiments, the second separator 420 may include an inorganic material (e.g., at least one of hexagonal boron nitride, germanane, molybdenum disulfide, tungsten diselenide, and Mxenes. According to still other embodiments, the second separator 420 may be formed of an inorganic oxide (e.g., at least one of silicon oxide ($SiO_2$), titanium oxide ($TiO_2$), zinc oxide (ZnO) and aluminum oxide ($Al_2O_3$)) or may be formed of metal (e.g., silver, copper, gold and aluminum). According to yet still other embodiments, the second separator 420 may include an organic material such as polymer.

Figure 3A:
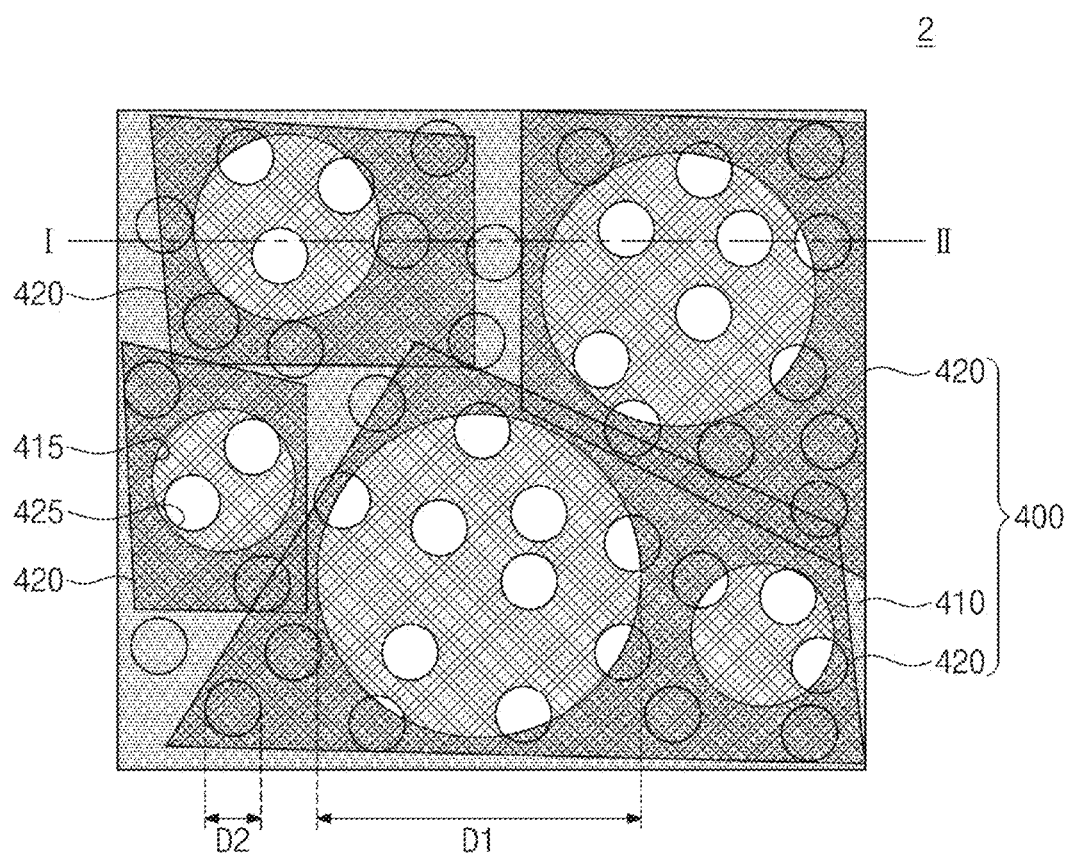
FIG. 3A is a plan view showing a lithium battery according to some embodiments of the inventive concepts.
Figure 3B:
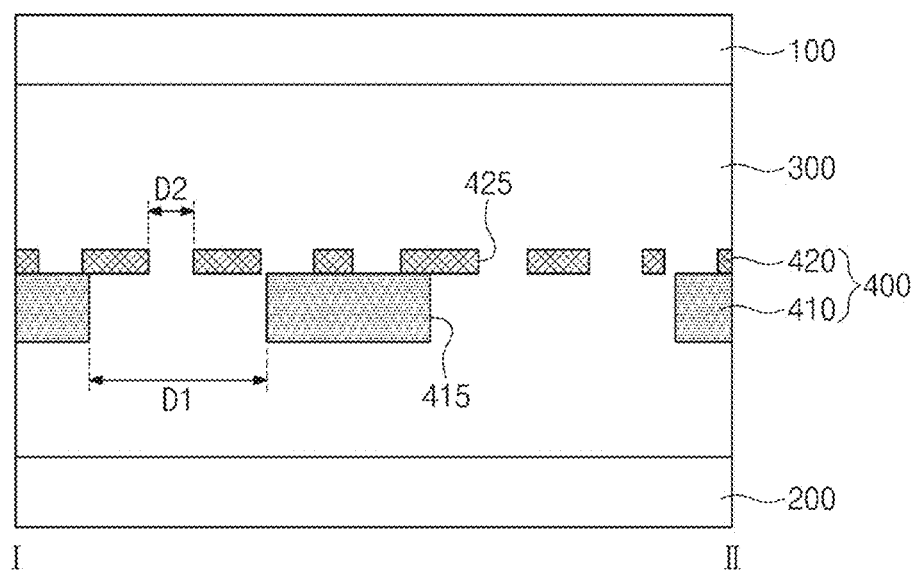
FIG. 3B is a cross-sectional view taken along the line I-II of FIG. 3A.

FIG. 3A is a plan view showing a lithium battery according to some embodiments of the inventive concepts. FIG. 3B is a cross-sectional view taken along the line I-II of FIG. 3A. For concise description, a previously described element may be identified by a similar or identical reference number without repeating an overlapping description thereof.

Referring to FIGS. 3A and 3B, a lithium battery 2 may include the anode 100, the cathode 200, the electrolyte 300, and the separator structure 400. The separator structure 400 may include the first separator 410 and the second separator 420. The first separator 410 may be substantially the same as the first separator 410 described with reference to FIGS. 1A and 1B. The second separator 420 may include a plurality of second separators. The plurality of the second separators 420 may be provided on the first separator 410. The second separators 420 may have second pores 425. The second pores 425 may be provided in such a way that at least some of them are overlapped with at least one of the first pores 415 when viewed in a plan view. The second diameters D2 may be smaller than the first diameters D1. The standard deviation of the second diameters D2 may be smaller than that of the first diameters D1. The second distance between the second pores 425 may be smaller than the first distance between the first pores 415.

Figure 4A:
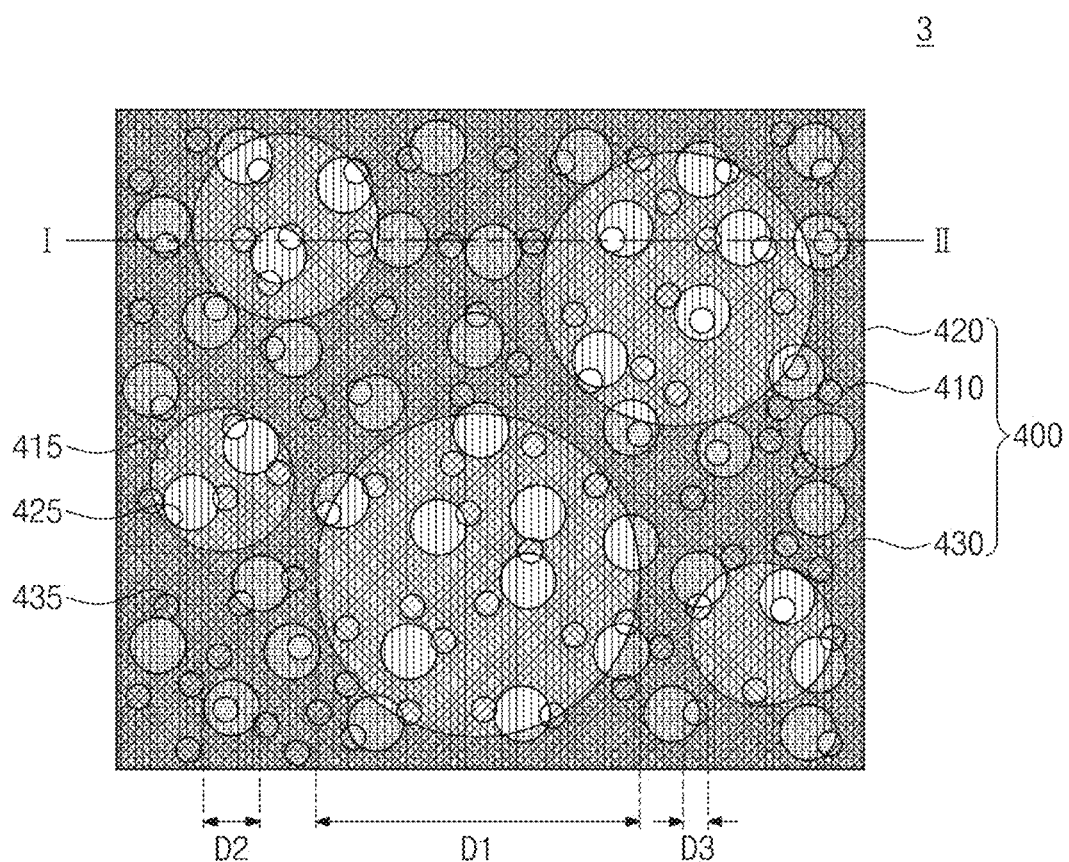
FIG. 4A is a plan view showing a lithium battery according to some embodiments of the inventive concepts.
Figure 4B:
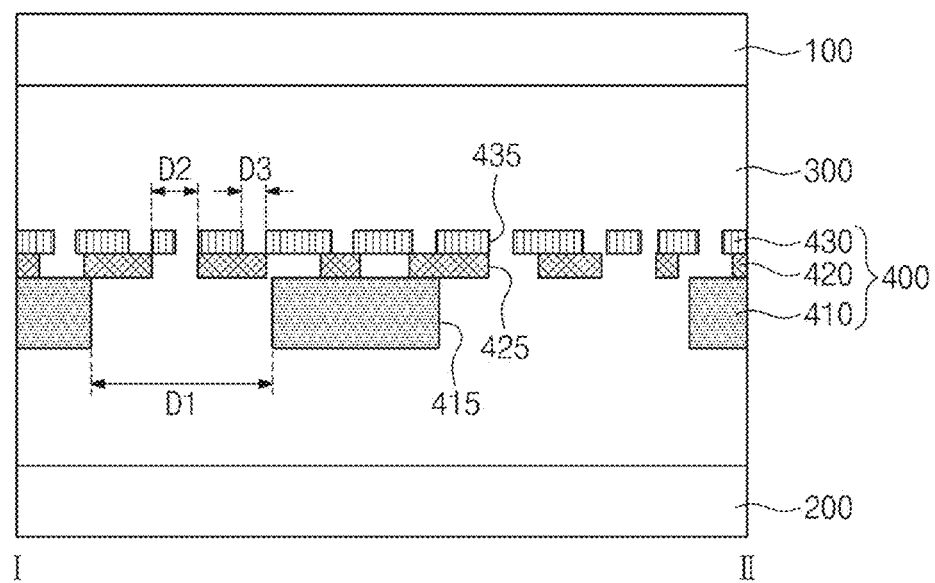
FIG. 4B is a cross-sectional view taken along the line I-II of FIG. 4A.

FIG. 4A is a plan view showing a lithium battery according to some embodiments of the inventive concepts. FIG. 4B is a cross-sectional view taken along the line I-II of FIG. 4A. In the following description, substantially the same elements as any of the aforementioned elements will be referenced with the same numerals and the detailed descriptions thereof will be omitted.

Referring to FIGS. 4A and 4B, a lithium battery 3 may include the anode 100, the cathode 200, the electrolyte 300, and the separator structure 400. The separator structure 400 may include a third separator 430, in addition to the first separator 410 and the second separator 420.

The third separator 430 may is provided to face the anode 100. The third separator 430 may have third pores 435. The third pores 435 may have third diameters D3. The third diameters D3 may be smaller than the first diameters D1. A standard deviation of the third diameters D3 may be smaller than that of the first diameters D1. The third pores 435 may be spaced apart from each other by a third distance. The third distance may be smaller than the first distance. Here, the third distance may mean an average distance between the third pores 435.

The third diameters D3 may be smaller than the second diameters D2. A standard deviation of the third diameters D3 may be smaller than that of the second diameters D2. The third distance may be smaller than the second distance. The lithium ions in the electrolyte 300 may pass through the first pores 415, the second pores 425, and the third pores 435. The number of stacked separators 410, 420, 430 may be not limited to that illustrated in the drawings and may be variously changed. For example, a fourth separator (not shown) may be further provided on the third separator 430.

Hereinafter, a method for producing a lithium battery according to the concept of the present invention will be described with the reference to the drawings.

FIGS. 5A to 8A are plan views illustrating a method of fabricating a separator structure according to some embodiments of the inventive concepts. FIGS. 5B to 8B are cross-sectional views taken along the line I'-II' of FIGS. 5A to 8A, respectively. For concise description, a previously described element may be identified by a similar or identical reference number without repeating an overlapping description thereof.

Figure 5A:
Figure 5B:
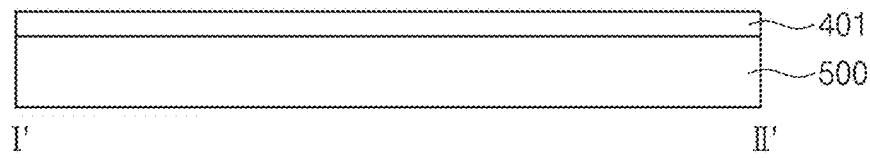

Referring to FIGS. 5A and 5B, a block copolymer may be coated onto a temporary substrate 500 to form a block copolymer film 401. The block copolymer may be defined as a polymer including at least two polymer blocks which are connected to each other by a covalent bond. The polymer blocks may have different properties from each other. The polymer blocks may be randomly mixed in the block copolymer film 401. The block copolymer may have a molecular weight ranging from 10 kg/mol to 200 kg/mol. For example, the block copolymer may include at least one of polystyrene-block-poly(methyl methacrylate), polybutadiene-block-poly(butyl methacrylate), polybutadiene-block-poly(dimethylsiloxane), polybutadiene-block-poly(methyl methacrylate), polybutadiene-block-poly(vinylpyridine), poly(butyl acrylate)-block-poly(methyl methacrylate), poly(butyl acrylate)-block-poly(vinylpyridine), polyisoprene-block-poly(vinylpyridine), polyisoprene-block-poly(methyl methacrylate), poly(hexyl acrylate)-block-poly(vinylpyridine), polyisobutylene-block-poly(butyl methacrylate), polyisobutylene-block-poly(methyl methacrylate), polyisobutylene-block-poly(butyl methacrylate), polyisobutylene-block-poly(dimethylsiloxane), poly(butyl methacrylate)-block-poly(butyl acrylate), poly(ethyl ethylene)-block-poly(methyl methacrylate), polystyrene-block-poly(butyl methacrylate), polystyrene-block-polybutadiene, polystyrene-block-polyisoprene, polystyrene-block-poly(dimethylsiloxane), polystyrene-block-poly(vinylpyridine), poly(ethyl ethylene)-block-poly(vinylpyridine), polyethylene-block-poly(vinylpyridine), poly(vinylpyridine)-block-poly(methyl methacrylate), poly(ethylene oxide)-block-polyisoprene, poly(ethylene oxide)-block-polybutadiene, poly(ethylene oxide)-block-polystyrene, poly(ethylene oxide)-block-poly(methyl methacrylate), poly(ethylene oxide)-block-poly(dimethylsiloxane), polystyrene-block-poly(ethylene oxide), polystyrene-block-poly(methyl methacrylate)-block-polystyrene, polybutadiene-block-poly(butyl methacrylate)-block-polybutadiene, polybutadiene-block-poly(dimethylsiloxane)-block-polybutadiene, polybutadiene-block-poly(methyl methacrylate)-block-polybutadiene, polybutadiene-block-poly(vinylpyridine)-block-polybutadiene, poly(butyl acrylate)-block-poly(methyl methacrylate)-block-poly(butyl acrylate), poly(butyl acrylate)-block-poly(vinylpyridine)-block-poly(butyl acrylate), polyisoprene-block-poly(vinylpyridine)-block-polyisoprene, polyisoprene-block-poly(methyl methacrylate)-block-polyisoprene, poly(hexyl acrylate)-block-poly(vinylpyridine)-block-poly(hexyl acrylate), polyisobutylene-block-poly(butyl methacrylate)-block-polyisobutylene, polyisobutylene-block-poly(methyl methacrylate)-block-polyisobutylene, polyisobutylene-block-poly(butyl methacrylate)-block-polyisobutylene, polyisobutylene-block-poly(dimethylsiloxane)-block-polyisobutylene, poly(butyl methacrylate)-block-poly(butyl acrylate), poly(ethyl ethylene)-block-poly(methyl methacrylate)-block-poly(ethyl ethylene), polystyrene-block-poly(butyl methacrylate)-block-polystyrene, polystyrene-block-polybutadiene-block-polystyrene, polystyrene-block-polyisoprene-block-polystyrene, polystyrene-block-poly(dimethylsiloxane)-block-polystyrene, polystyrene-block-poly(vinylpyridine)-block-polystyrene, poly(ethyl ethylene)-block-poly(vinylpyridine)-block-poly(ethyl ethylene), polyethylene-block-poly(vinylpyridine)-block-polyethylene, poly(vinylpyridine)-block-poly(methyl methacrylate)-block-poly(vinylpyridine), poly(ethylene oxide)-block-polyisoprene-block-poly(ethylene oxide), poly(ethylene oxide)-block-polybutadiene-block-poly(ethylene oxide), poly(ethylene oxide)-block-polystyrene-block-poly(ethylene oxide), poly(ethylene oxide)-block-poly(methyl methacrylate)-block-poly(ethylene oxide), poly(ethylene oxide)-block-poly(dimethylsiloxane)-block-poly(ethylene oxide), and polystyrene-block-poly(ethylene oxide)-block-polystyrene. Before the formation of the block copolymer film 401, ultraviolet ray or ozone treatment processes may be performed on the temporary substrate 500. Accordingly, a hydrophobic functional group or a hydrophilic functional group may be formed on the temporary substrate 500. For example, the hydrophilic functional group may include a hydroxyl group.

Figure 6A:
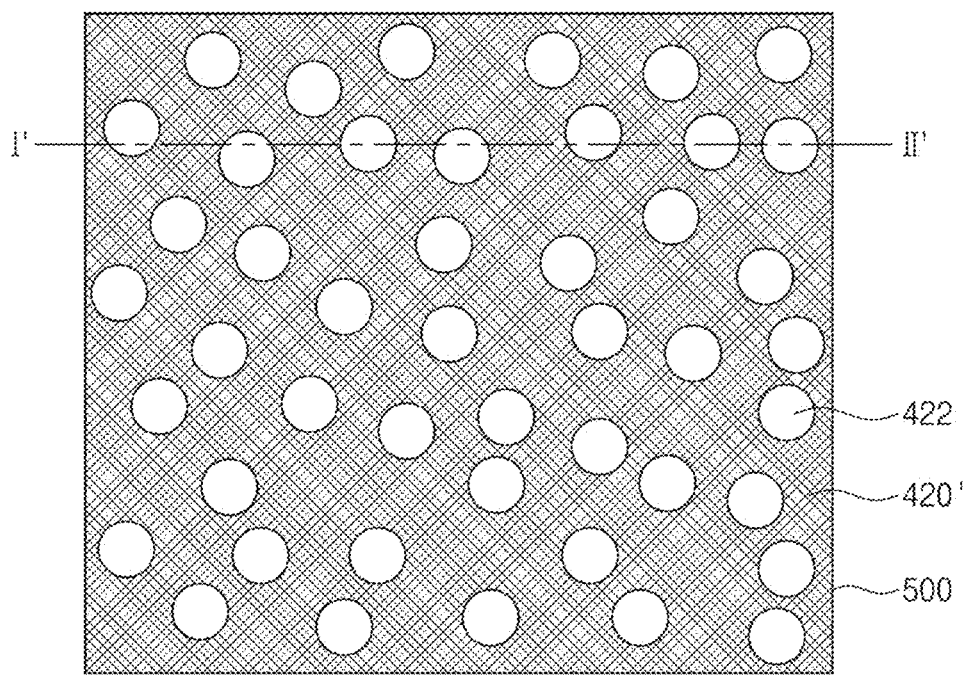
Figure 6B:
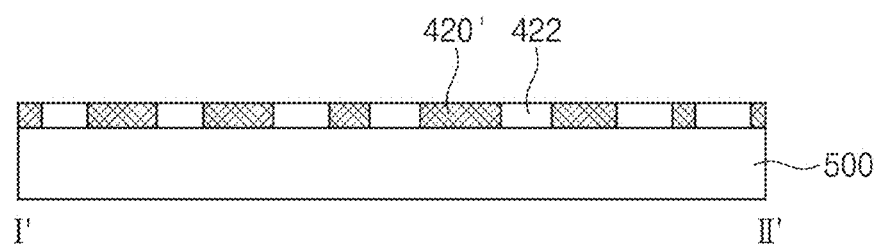

Referring to FIGS. 6A and 6B, the polymer blocks in the block copolymer film (401 in FIGS. 5A and 5B) may be phase separated. For example, heat or light may be applied onto the block copolymer film 401 to form a first block portion 420' and a second block portion 422. The first block portion 420' may include a polymer having property different from that of the second block portion 422. In some example, one of the first and second block portions 420' and 422 may have a hydrophilic property, and the other may have a hydrophobic property. In other example, one of the first and second block portions 420' and 422 may include an organic material, and the other may include an inorganic material. In still other example, one of the first and second block portions 420' and 422 may further include inorganic particles. The sizes, diameters, and planar shapes of the first block portion 420' and the second block portion 422 may be controlled in various ways. For example, the second block portion 422 may have a circular shape in a plan view, as shown in FIG. 1A. The first block portion 420' may surround the second block portion 422.

Figure 7A:
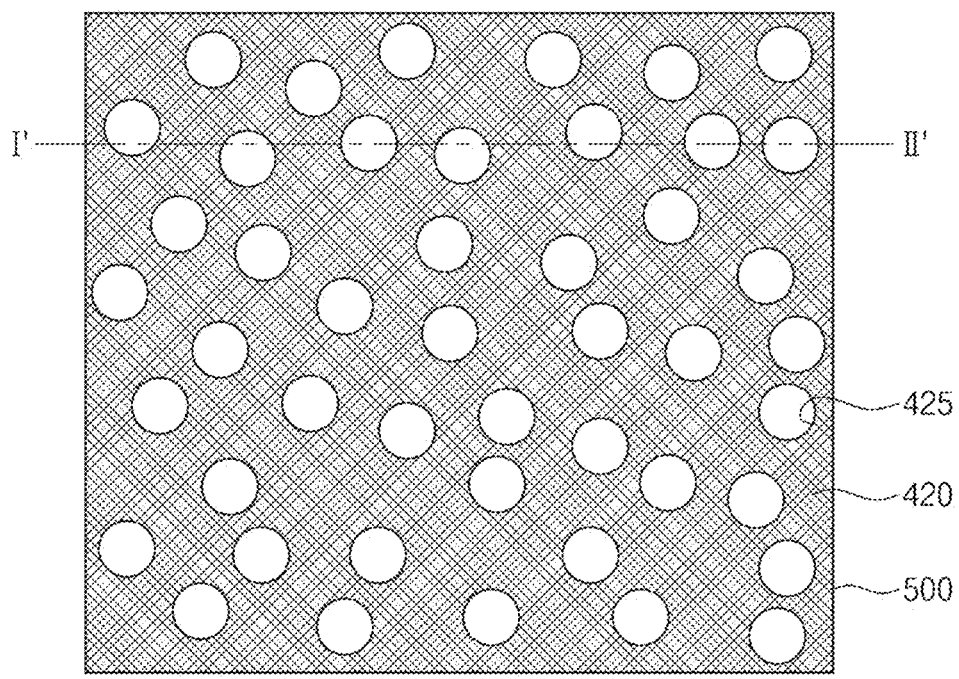
Figure 7B:
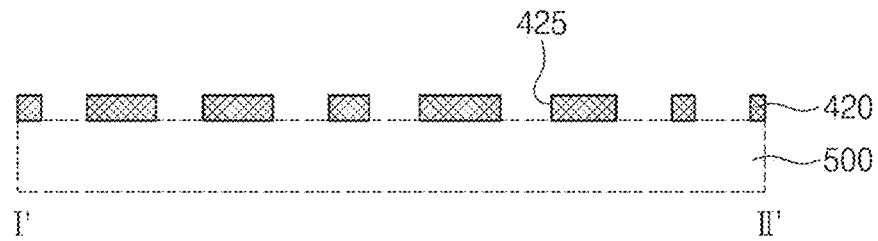

Referring to FIGS. 7A and 7B, the second block portion (422 in FIGS. 6A and 6B) may be removed to form second pores 425. The second pores 425 may expose the temporary substrate 500. The first block portion (420' in FIGS. 6A and 6B) may not be removed to form a second separator 420. The second block portion 422 may be removed by reactive ion etching (RIE) or ozone plasma treatment ($O_3$ plasma). In other example, a wet etching process may be performed on the block copolymer film 401 to remove the second block portion 422. Here, acetic acid, toluene, and/or propylene glycol methyl ether acetate (PGMEA) may be used as an etchant. Thereafter, the temporary substrate 500 may be removed to expose a bottom surface of the second separator 420. The removal of the temporary substrate 500 may be performed using hydrofluoric acid (HF).

Figure 8A:
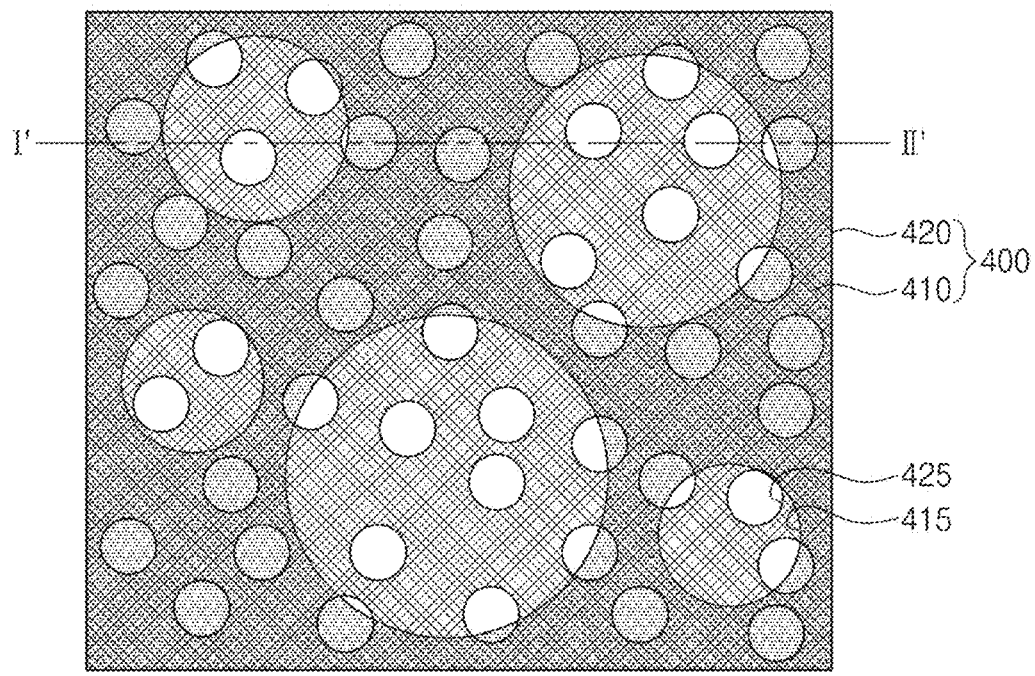
Figure 8B:
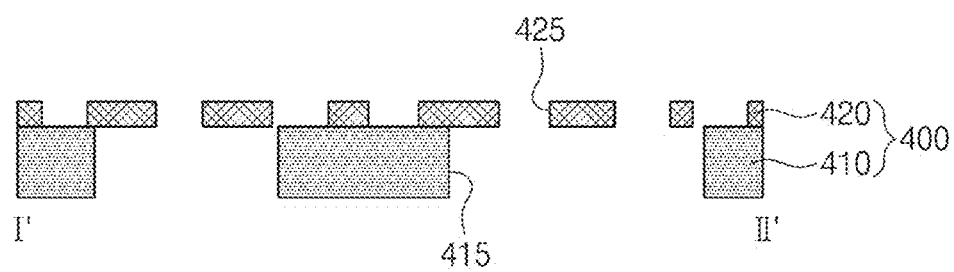

FIGS. 8A and 8B, the second separator 420 may be formed on the first separator 410 to form the separator structure 400. The first separator 410 may be substantially the same as the first separator 410 described in FIGS. 1A and 1B. For example, the second separator 420 may be transferred onto the first separator 410 in a wet or dry manner. An additional adhesive layer or an additional connection portion may not be formed between the first separator 410 and the second separator 420. In this case, it may be possible to simplify the process of forming the separator structure 400.

Referring again to FIGS. 1A and 1B, the anode 100 and the cathode 200 may be prepared. The anode 100 may be spaced apart from the cathode 200. The first separator 410 and the second separator 420 may be disposed between the anode 100 and the cathode 200. The first separator 410 and the second separator 420 may be manufactured by the same method as described in FIGS. 5A to 8B. The electrolyte 300 may be provided to fill a gap between the anode 100 and the cathode 200. The electrolyte 300 may be provided in the first pores 415 and in the second pores 425. The lithium battery 1 may be fabricated by the afore-described process.

According to another embodiment, although not illustrated, a planar area of the second separator 420 may be relatively small. In this case, a plurality of the second separators 420 may be prepared. The second separators 420 may be transferred onto the first separator 410. The transfer process may be performed several times to transfer the second separators 420 onto the first separator 410. In this case, the lithium battery may be manufactured to have the same structure as that of the lithium battery 2 of FIGS. 3A and 3B.

According to still another embodiment, a third separator 430 may be transferred onto the second separator 420 to form the lithium battery 3 of FIGS. 4A and 4B. In some embodiments, the third separator 430 may be formed using the same method as that for the second separator 420 described with reference to FIGS. 5A to 8B, but the inventive concept is not limited thereto.

Figure 9A:
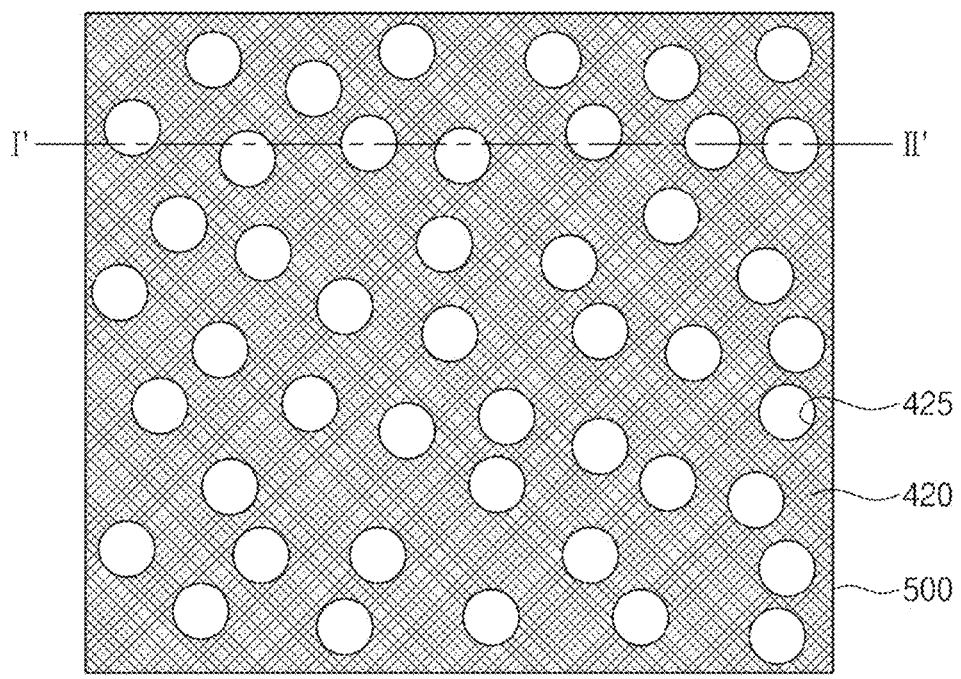
FIGS. 9A and 10A are plan views illustrating a method of manufacturing a separator structure according to some embodiments of the inventive concepts.
Figure 9B:
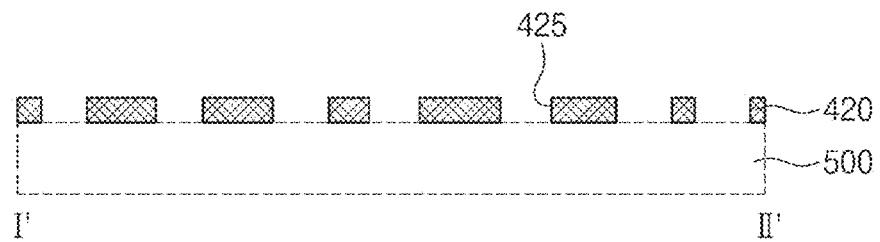
FIGS. 9B and 10B are cross-sectional views taken along the line I'-II' of FIGS. 9A and 10A, respectively.
Figure 10A:
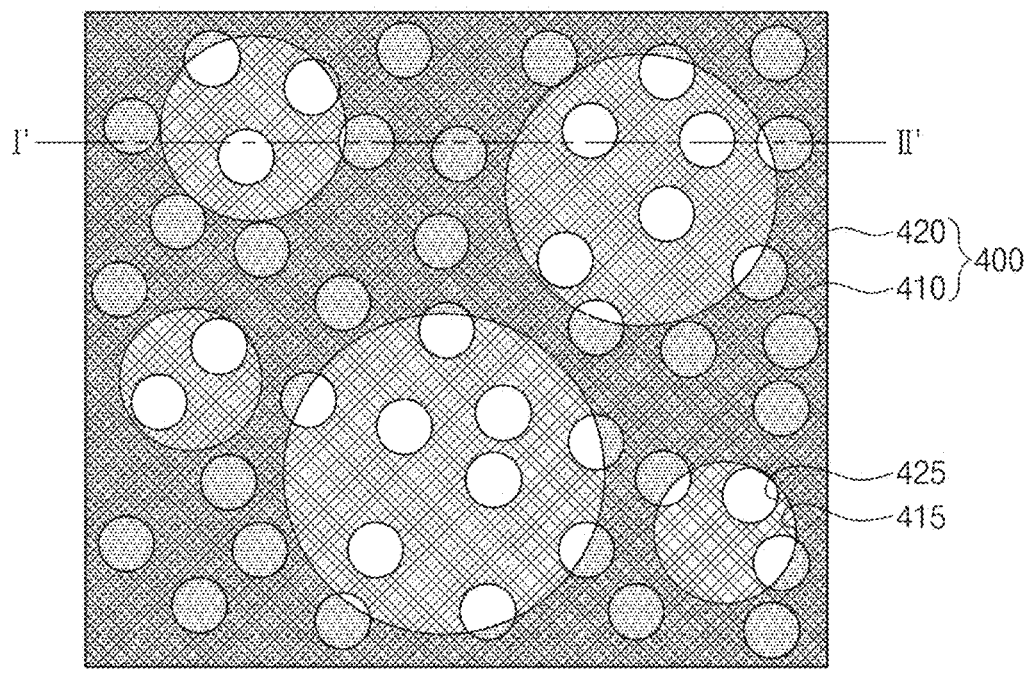
Figure 10B:
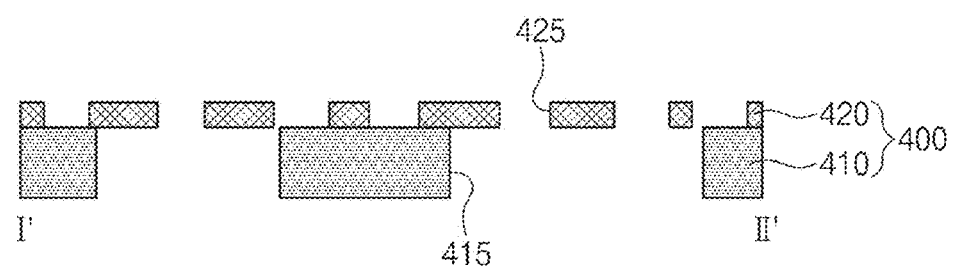

FIGS. 9A and 10A are plan views illustrating a method of manufacturing a separator structure according to some embodiments of the inventive concepts. FIGS. 9B and 10B are cross-sectional views taken along the line I'-II' in FIGS. 9A and 10A, respectively. In the following description, substantially the same elements as any of the aforementioned elements will be referenced with the same numerals and the detailed descriptions thereof will be omitted.

Referring to FIGS. 9A and 9B, a second separator 420 may be formed on the temporary substrate 500. A carbon material having oxygen-containing functional groups may be prepared. For example, the carbon material may comprise graphite. The oxygen-containing functional groups may be hydrophilic. The oxygen-containing functional groups may include a hydroxyl group, a carbonyl group, and/or an epoxy group. The oxygen-containing functional groups of the carbon material may be formed by reacting the carbon material with an oxidizing agent. The oxidizing agent may be selected from the group consisting of potassium manganese oxide (KMnO4), hydrogen peroxide, halogens, nitric acid, sulfuric acid, peroxydisulfuric acid, peroxymonosulfuric acid, sodium perborate, and/or nitrous oxide. The carbon material having the oxygen-containing functional groups may be added to a solvent to prepare a preparation solution. The solvent may be hydrophilic. For example, the solvent may include water, ethanol, methanol, and/or acetone. The carbon material may be well dispersed in the solvent due to the oxygen-containing functional groups. Using the preparation solution, a carbon structure may be formed. The formation of the carbon structure may include coagulating the preparation solution and vaporizing the solvent in the coagulated preparation solution. The vaporizing of the solvent may be performed under a reduced pressure. The carbon structure may be in a powder state. The carbon structure may include a graphene and/or a carbon nanotube. The carbon structure may include oxygen-containing functional groups, and the oxygen-containing functional groups of the carbon structure may be the same material as the oxygen-containing functional groups of the carbon material as described above. By heat treating (thermal treating) the carbon structure, the oxygen-containing functional groups of the carbon structure may be removed. Accordingly, pores may be formed in the carbon structure. By adding the carbon structure to a solvent, a precursor solution may be prepared. The carbon structure may be dispersed in the solvent. The precursor solution may be coated on the temporary plate 500 to form the second separator 420. The pores of the carbon structure may become the second pores 425 of the second separator 420. Accordingly, an additional process of forming the second pores 425 may be omitted. The coating of the precursor solution may be performed by a spin coating method, a doctor blade method, a spray coating method, or an interfacial assembly method. A heat treatment or a drying process may be further performed on the second separator 420.

Referring to FIGS. 10A and 10B, the second separator 420 may be transferred onto the first separator 410 to form the separator structure 400. The transfer of the second separator 420 may be performed in a wet or dry manner.

Figure 11A:
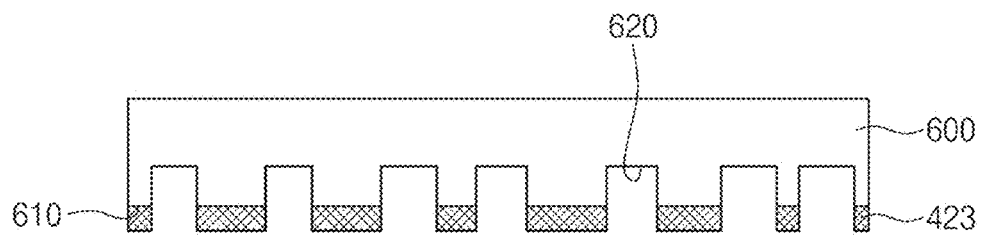
FIGS. 11A and 11B are cross-sectional views illustrating a method of manufacturing a separator structure according to some embodiments of the inventive concepts.
Figure 11B:
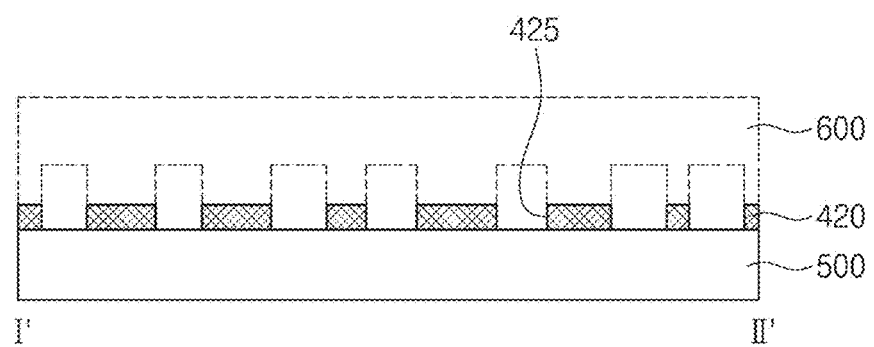

FIGS. 11A and 11B are cross-sectional views illustrating a method for manufacturing a separator structure according to some embodiments of the inventive concepts. In the following description, substantially the same elements as any of the aforementioned elements will be referenced with the same numerals and the detailed descriptions thereof will be omitted.

Referring to FIG. 11A, a preliminary separator 423 may be provided on a mold 600. An inorganic solution may be prepared. The inorganic solution may include inorganic oxide such as silicon oxide ($SiO_2$), titanium oxide ($TiO_2$), zinc oxide (ZnO), and/or aluminum oxide ($Al_2O_3$) or metal such as silver, copper, gold and aluminum. A polymer may be further added to the inorganic solution to adjust viscosity or volatility of the inorganic solution. The mold 600 may have a protruded portion 610 and a recessed portion 620. The inorganic solution may be coated onto the protruded portion 610 of the mold 600 to form the preliminary separator 423. The preliminary separator 423 may not be formed in the recess portion 620 of the mold 600.

Referring to FIGS. 11B and 9A, the second separator 420 may be formed on the temporary substrate 500. For example, the mold 600 may be provided on the temporary substrate 500 such that the protruded portion 610 of the mold 600 faces the temporary substrate 500. The preliminary separator (423 in FIG. 11A) may be transferred onto the temporary substrate 500 to form the second separator 420. The second separator 420 may have second pores 425.

Referring again to FIGS. 10A and 10B, the second separator 420 may be transferred onto the first separator 410 to form a separator structure 400. The temporary substrate (500 in FIGS. 9A and 9B) may be removed before or after the transfer of the second separator 420.

Hereinafter, the formation and evaluation of a lithium battery according to the experimental examples of the present invention will be described.

1. Formation of Separator Structure

Experimental Example 1-1

A graphite was oxidized using potassium permanganate and sulfuric acid to form oxygen-containing functional groups thereon. At this time, 1 g of the graphite, 3.5 g of potassium permanganate, and 45 mL of sulfuric acid were used. The oxidation of graphite was performed at 35° C. for 2 hours. 200 mL of water and 20 mL of hydrogen peroxide were added to the graphite, and then filtration and washing processes of the graphite were performed. The washing process was performed four times. The washed graphite was added to water to prepare a preparation solution. The preparation solution had a concentration of 1 g/L to 8 g/L. The preparation solution was coagulated. The water of the coagulated preparation solution was vaporized under a reduced pressure. Thus, a carbon structure of powder state was prepared. The carbon structure was treated at 220☐ for 20 minutes and then was treated at 440☐ for 40 minutes. The carbon structure was dispersed in ethanol to prepare a precursor solution. The precursor solution was added to water, and then transferred onto a first separator to form a second separator. A polymer separator was used as the first separator. Thus, a separator structure was manufactured.

Experimental Example 1-2

A silicon oxide substrate was prepared as a temporary substrate. Ultraviolet ray and ozone were treated on the temporary substrate to form a hydroxyl group on the temporary substrate. Polystyrene-block-poly(methyl methacrylate) (PS-r-PMMA) having 10 kg/mol was prepared as a block copolymer. The block copolymer was applied on the temporary substrate to form a block copolymer film. The block copolymer film was treated at 160° C. for 2 hours to form a covalent bond between the block copolymer and the temporary substrate. Ultraviolet ray of 254 nm was applied onto the block copolymer film for 5 minutes to form a first block portion and a second block portion. The first block portion comprises polystyrene and the second block portion comprises poly(methyl methacrylate). The temporary substrate was treated with acetic acid for 10 minutes to remove the second block portion. The block copolymer film was washed twice using water and dried to prepare a second separator. The temporary substrate was removed by using a hydrofluoric acid aqueous solution. The second separator was transferred onto a first separator. A polymer separator was used as the first separator.

2. Formation of Half-Cell

Comparative Example

Ethylene carbonate (EC) and polycarbonate (PC) were mixed to prepare a solvent. Lithium hexafluorophosphate (LiPF6) was dissolved in the solvent to prepare a 1.5M electrolyte. The electrolyte was filled a gap between an anode and a cathode to manufacture a lithium battery. Lithium metal was used as the anode, and LiCoO2 was used as the cathode.

Experimental Example 2

A lithium battery was manufactured in the same method as the comparative example 1. However, in the present experimental example, the separator structure of experimental example 1-1 was disposed in the electrolyte.

Figure 12:
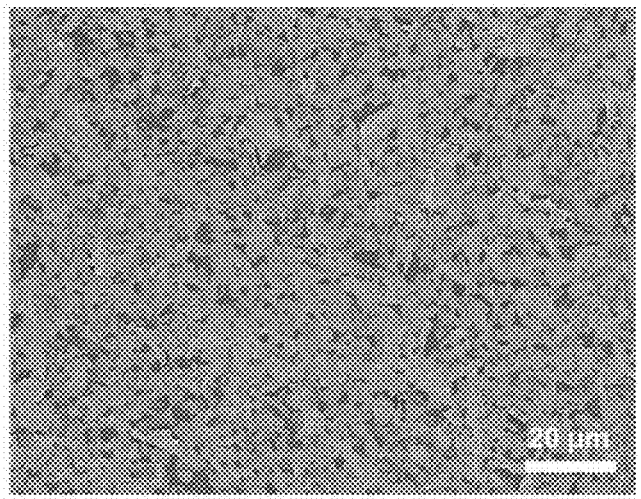
FIG. 12 is a scanning electron microscope (SEM) image showing a top surface of a second separator that was obtained in an experimental example 1-1.
Figure 13A:
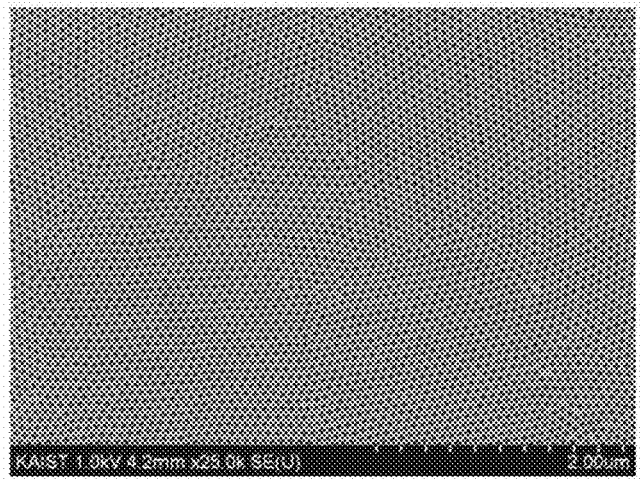
FIGS. 13A and 13B are SEM images showing top and side structures of a second separator that was obtained in an experimental example 1-2.
Figure 13B:
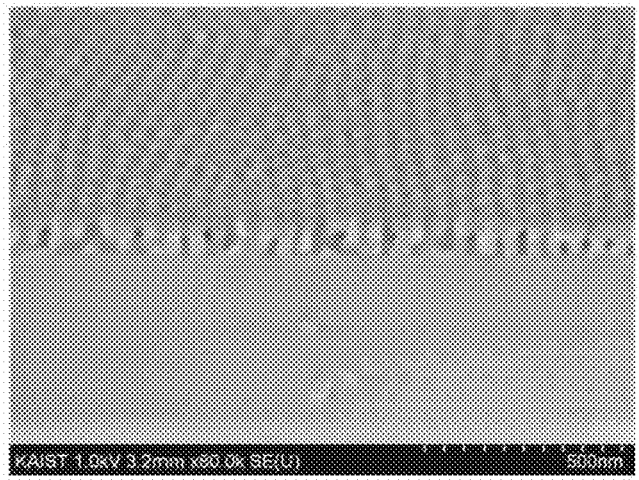

FIG. 12 is a scanning electron microscope (SEM) image showing a top surface of a second separator that was obtained after the transfer step in an experimental example 1-1. FIGS. 13A and 13B are SEM images showing top and side structures of a second separator that was obtained before the transfer step in an experimental example 1-2. In the following description, substantially the same elements as any of the aforementioned elements will be referenced with the same numerals and the detailed descriptions thereof will be omitted.

As shown in FIGS. 12, 13A, and 13B, the second pores 425 were formed in the second separator 420 of each of the experimental examples 1-1 and 1-2. The second pores 425 were formed to have a relatively uniform distribution.

Figure 14:
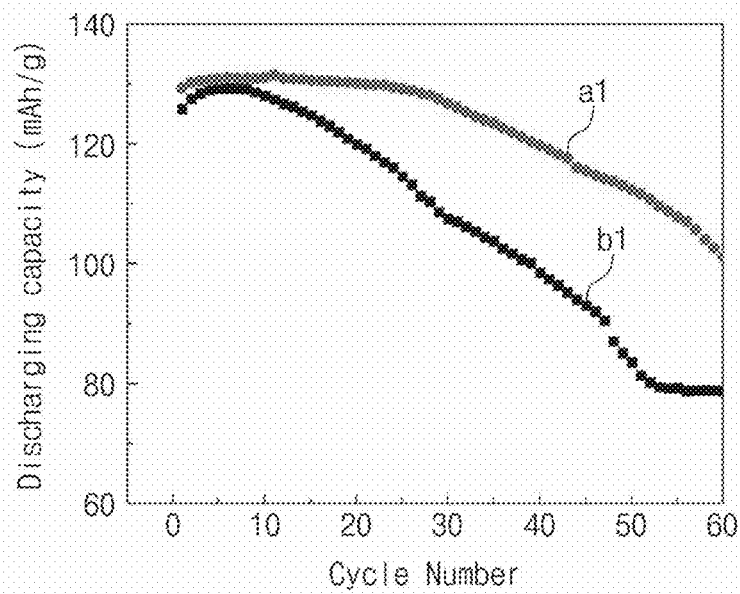
FIG. 14 is a graph showing discharging capacity characteristics of a comparative example and an experimental example 2.
Figure 15:
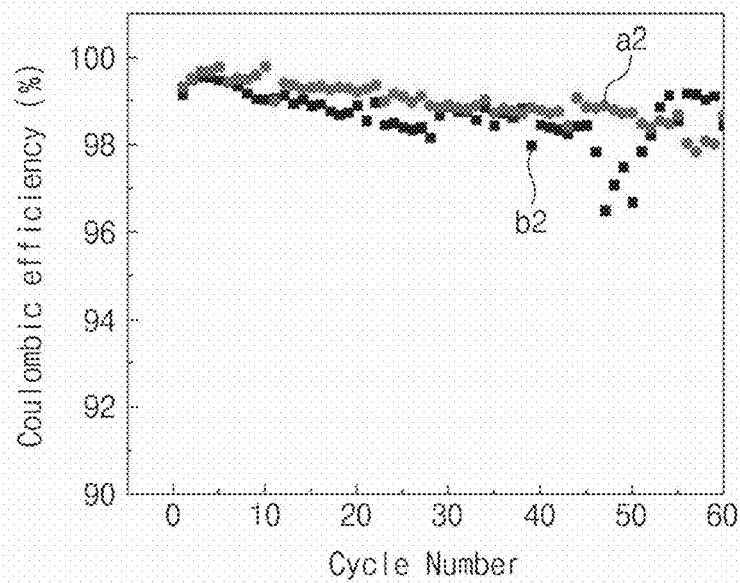
FIG. 15 is a graph showing Coulombic efficiencies of a comparative example and an experimental example 2.

FIG. 14 is a graph showing discharging capacity characteristics of a comparative example and an experimental example 2. In FIG. 14, x-axis represents the number of charging/discharging cycles, and y-axis represents discharging capacity. FIG. 15 is a graph showing Coulombic efficiencies of a comparative example and an experimental example 2. In FIG. 15, x-axis represents the number of charging/discharging cycles, and y-axis represents Coulombic efficiency. Hereinafter, the comparative example and the experimental example 2 will be described with reference to FIGS. 14 and 15, along with FIGS. 1A and 1B.

As shown in FIG. 14, discharging capacity was higher in the experimental example 2 (a1) than in the comparative example (b1). That is, the reduction of discharging capacity over time was smaller in the experimental example 2 (a1) than in the comparative example (b1). As shown in FIG. 15, the coulombic efficiency was higher in the experimental example 2 (a2) than in the comparative example (b2). That is, the reduction of coulombic efficiency over time was smaller in the experimental example 2 (a2) than in the comparative example (b2). In the experimental example 2, the lithium battery 1 may be configured to include the separator structure 400. Since the separator structure 400 includes the second separator 420, the dendrite can be prevented from being formed. As a result, it may be seen that the lithium battery 1 of experimental example 2 has improved performance and life time.

The separator structure according to the inventive concept may include the first separator and the second separator. The second pores of the second separator may have a smaller diameter than the first pores of the first separator. The second pores may be more uniform than the first pores in terms of size, shape, and density. It may be possible to prevent or suppress the lithium ions in the electrolyte from being concentrated in a specific region of the anode. Thus, the formation of impurities such as the dendrite may be prevented. Since the second separator is provided to face the anode, it may be possible to more effectively prevent the formation of dendrite. This may make it possible to improve reliability and stability of the lithium battery.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A lithium battery comprising:
   a cathode;
   an anode separated from the cathode;
   a first separator disposed between the cathode and the anode, the first separator having first pores;
   a second separator disposed on the first separator, the second separator having second pores; and
   an electrolyte filling a gap between the cathode and the anode,
   wherein diameters of the second pores are smaller than those of the first pores, and
   a standard deviation of the diameters of the second pores is smaller than that of the first pores.

2. The lithium battery of claim 1, wherein a distance between the second pores is smaller than a distance between the first pores.

3. The lithium battery of claim 1, wherein at least some of the second pores are connected to the first pores; and
   the second separator is in direct physical contact with the first separator.

4. The lithium battery of claim 1, wherein the second separator faces the anode.

5. The lithium battery of claim 1, further comprising a third separator that is disposed on the second separator and has third pores,
   wherein diameters of the third pores are smaller than those of the first pores, and
   a standard deviation of the diameters of the third pores is smaller than that of the first pores.

6. The lithium battery of claim 1, wherein the second separator comprises a plurality of second separators, and
   the plurality of second separators are disposed on the first separator.

7. A method of manufacturing a lithium battery, comprising:
   preparing a first separator having first pores;
   forming a second separator having second pores, on a temporary substrate; and
   transferring the second separator onto the first separator,
   wherein diameters of the second pores are smaller than those of the first pores, and
   a standard deviation of the diameters of the second pores is smaller than that of the first pores.

8. The method of claim 7, wherein a distance between the second pores is smaller than a distance between the first pores.

9. The method of claim 7, wherein at least some of the second pores are connected to the first pores.

10. The method of claim 7, further comprising:
    preparing an anode;
    preparing a cathode;
    placing the first and second separators between the anode and the cathode; and
    forming an electrolyte to fill a gap between the anode and the cathode.

11. The method of claim 10, wherein the second separator faces the anode.

12. The method of claim 7, further comprising forming a third separator that is disposed on the second separator and has third pores.

13. The method of claim 12, wherein diameters of the third pores are smaller than those of the first pores, and
    a standard deviation of the diameters of the third pores is smaller than that of the first pores.

14. The method of claim 12, wherein diameters of the third pores are smaller than those of the second pores, and
    a standard deviation of the diameters of the third pores is smaller than that of the second pores.

15. The method of claim 7, wherein the second separator comprises a plurality of second separators, each of which is independently transferred onto the first separator.

16. The method of claim 7, wherein the forming of the second separator comprises:
    coating a block copolymer onto the temporary substrate to form a block copolymer film;
    applying heat or light to the block copolymer film to form a first block portion and a second block portion; and
    removing the second block portion to form the second pores exposing the temporary substrate.

17. The method of claim 7, wherein the forming of the second separator comprises:
    forming a carbon structure having oxygen-containing functional groups;
    thermally treating the carbon structure to form pores;
    adding the carbon structure into a solvent to form a precursor solution; and
    coating the temporary substrate with the precursor solution.

18. The method of claim 7, wherein the forming of the second separator comprises:
    preparing a mold having a protruding portion;
    forming a preliminary separator on the protruding portion of the mold; and
    transferring the preliminary separator onto the temporary substrate.

* * * * *